United States Patent
Baek et al.

(10) Patent No.: US 8,410,404 B2
(45) Date of Patent: Apr. 2, 2013

(54) COOKING APPLIANCE

(75) Inventors: Chae Hyun Baek, Seoul (KR); Jeong Ho Lee, Seoul (KR); Yong Soo Lee, Seoul (KR); Seung Chan Lee, Seoul (KR); Yang Kyeong Kim, Seoul (KR); Seung Jo Baek, Seoul (KR); Young Seok Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 308 days.

(21) Appl. No.: 12/860,706

(22) Filed: Aug. 20, 2010

(65) Prior Publication Data

US 2011/0049122 A1    Mar. 3, 2011

(30) Foreign Application Priority Data

Aug. 28, 2009 (KR) .................. 10-2009-0080682

(51) Int. Cl.
*F27D 11/00*    (2006.01)
(52) U.S. Cl. ....................................... 219/385
(58) Field of Classification Search .............. 219/385; 428/325; 501/185
See application file for complete search history.

(56) References Cited

U.S. PATENT DOCUMENTS

| 6,511,931 | B1 | 1/2003 | Baldwin |
| 6,566,289 | B2* | 5/2003 | Aronica et al. ............... 501/24 |
| 6,896,934 | B2 | 5/2005 | Aronica et al. |
| 7,005,396 | B2 | 2/2006 | Espargilliere et al. |
| 2003/0059600 | A1 | 3/2003 | Gazo et al. |
| 2003/0064874 | A1 | 4/2003 | Eckmann et al. |
| 2006/0189470 | A1 | 8/2006 | Mitra |
| 2007/0265154 | A1 | 11/2007 | Baldwin et al. |
| 2009/0311514 | A1* | 12/2009 | Shon et al. ................... 428/325 |
| 2011/0129679 | A1* | 6/2011 | Svetlana et al. .............. 428/433 |

FOREIGN PATENT DOCUMENTS

WO    WO 2008/027647 A1    3/2008

\* cited by examiner

*Primary Examiner* — David S Blum
(74) *Attorney, Agent, or Firm* — McKenna Long & Aldridge LLP (57) ABSTRACT

The present invention includes a cooking appliance with an enamel composition. The enamel composition includes a heat resistance, chemical resistance, wear resistance, and pollution resistance, such that the cooking appliance withstands high temperature, acid or alkali and is readily cleaned.

17 Claims, 4 Drawing Sheets

COOKING APPLIANCE

This application claims priority to Korean Patent Application No. 10-2009-0080682, filed on Aug. 28, 2009 in the Republic of Korea, the contents of which is incorporated by reference herein in its entirety.

BACKGROUND OF THE INVENTION

1. Field of the Invention

The present invention relates to a cooking appliance, and more specifically, to a cooking appliance including an enamel composition.

2. Description of the Related Art

Enamel is formed by applying a glassy glaze on a surface of a metal plate. Generally, the enamel is used for a cooking appliance, etc., such as a microwave oven and other types of ovens. Meanwhile, the enamel is classified into acid-resistant enamel that can prevent oxidation and heat-resistant enamel that can withstand a high temperature, etc., according to the type of glaze. Further, the enamel is classified into aluminum enamel, zirconium enamel, titanium enamel, soda-lime glass enamel, etc., according to the materials added to the enamel.

Generally, the cooking appliance is a device that cooks foods by heating them using a heating source. Since food waste, etc., produced during cooking becomes attached to an inner wall of a cavity of the cooking appliance, when the cooking of foods is completed in the cooking appliance, the inner portion of the cavity should be cleaned. Further, since foods are cooked at a high temperature, the inner wall of the cavity, etc., is exposed to organic materials and alkali components. Therefore, when the enamel is used for cooking devices, the enamel needs heat resistance, chemical resistance, wear resistance, pollution resistance, etc. Therefore, a need exists for enamel that can facilitate the cleaning of the cooking appliance and can better withstand a high temperature. In other words, a need exists for a cooking appliance that includes an enamel composition that improves the heat resistance, chemical resistance, wear resistance, and pollution resistance of the enamel.

SUMMARY OF THE INVENTION

It is a feature of the present invention to provide an enamel composition with an improved heat resistance, chemical resistance, wear resistance, and pollution resistance, such that a cooking appliance including the enamel composition can better withstand a high temperature, acid or alkali and be easily cleaned.

A cooking appliance according to one embodiment of the present invention includes: a cavity forming a cooking chamber; a door that selectively opens and closes the cooking chamber; at least one heating source that provides heat to heat food in the cooking chamber, and a coating layer coating an inner surface of the cavity, the coating layer is formed by an enamel composition produced by one frit including $P_2O_5$.

A cooking appliance according to one embodiment of the present invention includes: a cavity in which a cooking chamber is formed; a door that selectively opens and closes the cooking chamber; at least one heating source that provides heat to heat food, and a space formed by the door and the cooking chamber where food is cooked, the door is shielded and a coating layer coating an inner surface of the space, wherein the coating layer is formed by an enamel composition produced by one frit including $P_2O_5$.

The enamel composition applied to the cooking appliance according to the present invention improves the heat resistance, the chemical resistance, the wear resistance, and the pollution resistance. Therefore, when the enamel composition is used in the inner surface of the cavity of the cooking appliance, the enamel composition has excellent heat resistance to better withstand a high temperature, has excellent pollution resistance to facilitate the cleaning of the cooking appliance after cooking, has excellent chemical resistance not to be modified by organic materials and alkali-based chemical components, and is not corroded even though it is used for a long time. Further, the enamel composition can be produced using a single glass frit, not multiple frits which need mixing, and can save energy costs necessary to produce and simplify the producing process. Moreover, when the enamel composition uses two or more frits, the uneven mixing between the frits occurs, but when the enamel composition uses one frit, even mixing occurs.

DETAILED DESCRIPTION OF THE PREFERRED EMBODIMENTS

Hereinafter, a cooking appliance including an enamel composition will be described with reference to the accompanying drawings and the enamel composition will be described in more detail.

Figure 1:
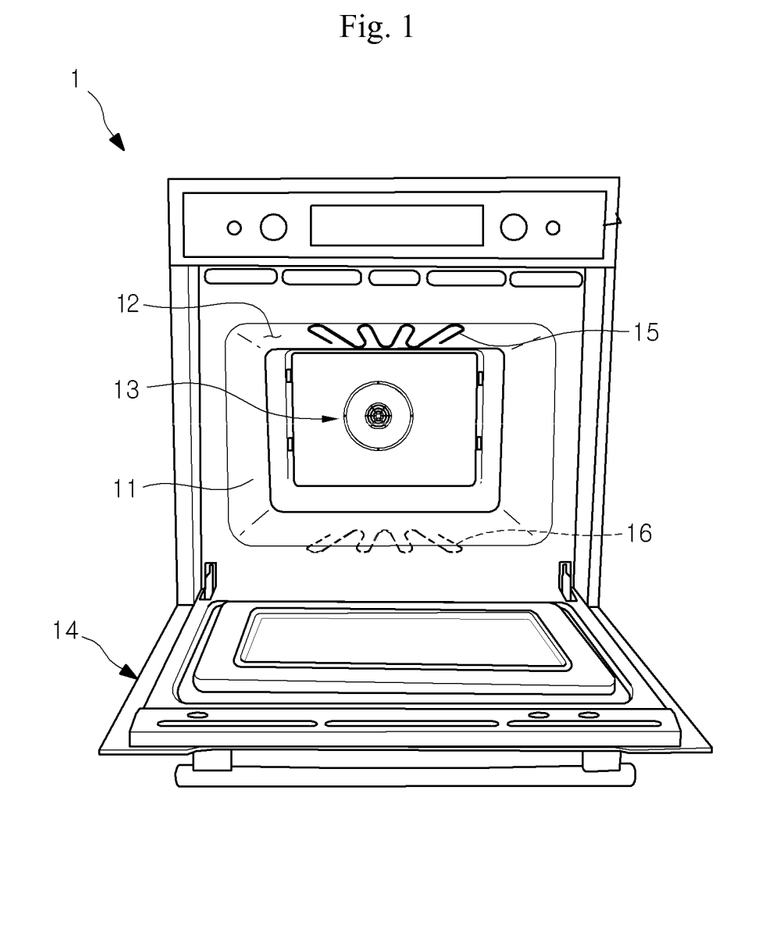
FIG. 1 is a diagram showing a cooking appliance made of enamel including enamel composition according to the present invention.

FIG. 1 is a perspective view of a cooking appliance according to the present invention.

Referring to FIG. 1, a cooking appliance 1 includes a cavity 11 in which a cooking chamber 12 is formed; a door 14 that selectively opens and closes the cooking chamber, heating sources 13, 15, and 16 that provide heat to heat food in the cooking chamber 12, and a coating layer coated on an inner surface of the cavity.

In detail, the cavity 11 may be formed in a hexahedron shape of which the front surface is approximately opened. The heating source includes an upper heater 15 that is disposed at an upper side of the cavity 11 and a lower heater 16 that is disposed at a lower side of the cavity 11. The upper heater 15 and the lower heater 16 may be provided at the inner portion or the outer portion of the cavity 11. In addition, the rear side of the cavity 11 may be provided with a convection assembly 13 that discharges heated air to the inner portion of the cavity 11.

In addition, the coating layer is coated with enamel including an enamel composition according to the Experimental Examples 1 to 5. The coating layer is formed by the enamel composition produced by one frit. Therefore, the number of producing processes is reduced to save production costs as compared to forming the enamel composition by two or more frits. In addition, when two or more frits are used, an uneven mixing between the frits can occur and when one frit is used according to the present invention, an even mixing occurs.

Figure 2:
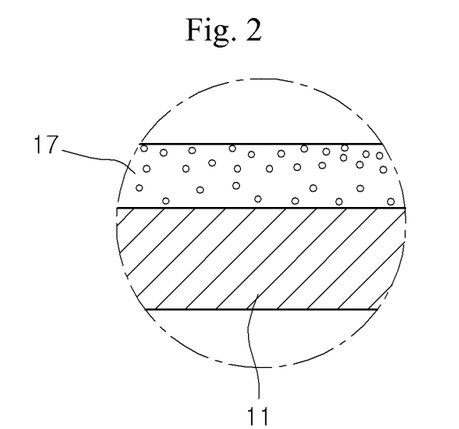
FIG. 2 is an enlarged view of a part of an inner surface of a cavity of FIG. 1.

Referring to FIG. 2, the inner surface of the cooking chamber 12, that is, the inner surface of the cavity 11 is provided with a coating layer 17. Substantially, the coating layer 17 is provided on the surface of a plate that forms the cavity 11. The coating layer 17 improves the heat resistance, chemical resistance, and pollution resistance of the inner surface of the cavity 12. This will be described in detail with reference to the following experimental examples, etc.

Figure 3:
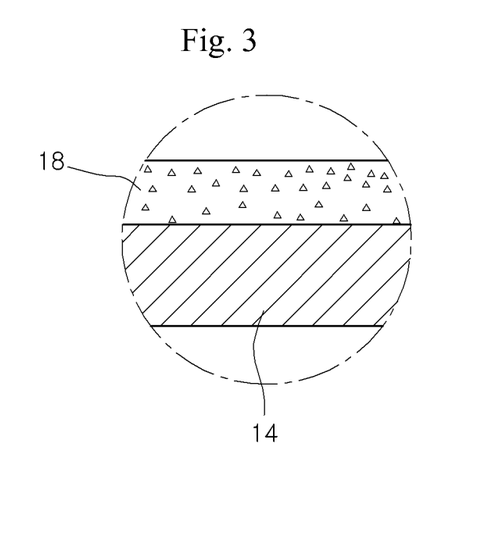
FIG. 3 is an enlarged view of a part of a rear surface of a door of FIG. 1.

Referring to FIG. 3, the rear surface of the door 14 includes a coating layer 18. In particular, in the state where the cooking chamber 12 is shielded, the rear surface of the door 14 facing the cooking chamber 12 includes a coating layer 18. The coating layer 18 improves the heat resistance, chemical resistance, and pollution resistance of the door 14. In other words, the rear surface of the door has the same effect as the inner surface of the cavity 11. In addition, in the state where the door 14 is shielded, it is formed by the door 14 and the cooking chamber 12 and the inner surface of the space (not shown) cooking food. The space (not shown) is opened by the door 14 and may be a space that cooks food between the cooking chamber 12 and the rear surface of the door 14.

Therefore, since the inner surface of the cavity 11 and the rear surface of the door 14 are provided with coating layers 17 and 18 and the space (not shown) formed between the door 14 and the cooking chamber 12 is also provided with a coating layer (not shown), the inner surface of the cavity 11, the rear surface of the door 14, and the space have an improved heat resistance and can withstand the cooking and cleaning at a high temperature for a long time. In addition, the inner surface of the cavity 11, the rear surface of the door 14, and the space have the improved pull resistance to reduce the pollution of the inner surface of the cavity 11, the rear surface of the door 14, and the contamination that occurs due to organic materials. The cleaning of the inner surface of the cavity 11, the rear surface of the door 14, and the space are easily performed. Moreover, the inner surface of the cavity 11, the rear surface of the door 14, and the space have an improved chemical resistance, such that they are not modified by organic materials and alkali-based chemical components and are not corroded even though they are used extensively.

The enamel composition applied to the cooking appliance according to the present invention will be described below in detail.

The enamel composition according to the present invention is produced by one frit. In addition, the enamel composition includes $P_2O_5$, $SiO_2$, $Al_2O_3$, $ZrO_2$, and $R_2O$. In the $R_2O$, R includes Li, Na or K.

In particular, the enamel made of the enamel composition is phosphate-based enamel including $P_2O_5$. The phosphate-based enamel is a hydrophilic material and therefore, is easily combined with water. The organic materials and the hydrophilic materials are not mixed well. Therefore, when the cooking appliance, etc., polluted with the organic materials is cleaned with water, the cooking appliance coated with the enamel is easily cleaned. In other words, the larger the content of $P_2O_5$ contained in the enamel, the larger the hydrophile property of the enamel becomes. Therefore, the material coated with the enamel increases the pollution resistance. Consequently, since the degree of cleaning is changed according the content of $P_2O_5$, the cleaning performance will be described in detail according to the content of $P_2O_5$ in the following experimental examples.

In the enamel composition, $P_2O_5$, $SiO_2$, and $R_2O$ are basic components of glass composition. In particular, $SiO_2$ has a connection with forming glass and the glass may have high acid resistance according to the content of $SiO_2$.

$Al_2O_3$ plays a role of supplementing the low chemical durability of an alkali phosphate glass structure through structural stabilization. $Al_2O_3$ have a connection with high heat resistance (transition temperature) and surface hardness.

$ZrO_2$ is a very stable material as an inorganic material and evenly melts components forming glass to increase chemical resistance of glass. $ZrO_2$ hinders the movement of alkali ion to increase specific resistance, to improve adhesion of enamel during a dry process.

In addition, the enamel composition may further include $B_2O_3$, ZnO, $V_2O_5$, or SnO.

$V_2O_5$ has a high heat resistance, surface hardness, etc., and therefore, is similar to $Al_2O_3$. SnO increases chemical resistance of glass, etc., and therefore, is similar to $ZrO_2$.

$B_2O_3$ evenly melts each component and controls a heat expansion coefficient of glass according to the content of $B_2O_3$. The content of ZnO controls surface tension of glass and has an effect on preparing characteristics of enamel, i.e., coating.

The range of wt % of components forming the composition is preferably represented in the following Table 1.

TABLE 1

| Component | Wt % |
|---|---|
| $P_2O_5$ | 24.8 to 34.3 |
| $SiO_2$ | 10.8 to 22.2 |
| $Al_2O_3$ | 10.2 to 28.4 |
| $ZrO_2$ | 5.0 to 17.9 |
| $Na_2O$ | 9.0 to 20.8 |
| $K_2O$ | 5.0 to 15.2 |
| $Li_2O$ | 0.4 to 5.3 |
| $B_2O_3$ | 1.0 to 10.0 |
| ZnO | 0.3 to 10.0 |
| $V_2O_5$ | 0.9 to 10.0 |
| SnO | 0.5 to 5.0 |

The range of wt % of components forming the composition is preferably represented in the following Table 2.

TABLE 2

| Component | Wt % |
|---|---|
| $P_2O_5$ | 25.1 to 31.1 |
| $SiO_2$ | 14.8 to 19.4 |
| $Al_2O_3$ | 12.2 to 21.4 |
| $ZrO_2$ | 6.4 to 11.7 |
| $Na_2O$ | 9.5 to 16.7 |
| $K_2O$ | 8.9 to 14.2 |
| $Li_2O$ | 0.45 to 3.4 |
| $B_2O_3$ | 1.5 to 8.0 |
| ZnO | 0.7 to 8.0 |
| $V_2O_5$ | 0.9 to 8.0 |
| SnO | 0.5 to 4.0 |

Further, the enamel composition may further include at least one of BaO and $TiO_2$. In the enamel composition, BaO is 0.3 wt % to 5.0 wt % and $TiO_2$ may be the range of 0.1 wt % to 5.0 wt %.

In addition, the enamel composition may further include a mixture where at least one of CoO and Fe2O3 is mixed. In the enamel composition, the mixture where CoO and Fe2O3 are mixed may be the range of 0.1 wt % to 1.0 wt %.

The BaO and $TiO_2$ and the mixture have an effect on preparing characteristics of enamel, i.e., coating.

In the following experimental example, the content of components of the enamel composition is represented in the following Table.

The protective scope of the present invention is limited only by matters set forth in claims and those skilled in the art can improve and change the technical subjects of the present invention in various forms. Therefore, as long as these improvements and changes are apparent to those skilled in the art, they are included in the protective scope of the present invention Experimental Example 1

Preparation of Glass

Raw materials of each component as described below are combined, which was sufficiently mixed in a V-mixer for three hours. Herein, $NH_4H_2PO_4$, $AlPO_4$, and $Al(PO_3)_3$ are used as raw materials of $P_2O_5$, $Na_2CO_3$ is used as a raw material of $Na_2O$, $K_2CO_3$ is used as a raw material of $K_2O$, and $Li_2CO_3$ is used as a raw material of $Li_2O$ and the remaining components are used as in the following Table 3.

The sufficiently mixed composition is fully melted for 1 hour to 2 hours, rapidly cooled by distilled water or a chiller, and then dried, thereby obtaining glass frit.

0.1 wt % to 1 wt % of organopoly siloxane (for example, DOW Corning 1107) and acetone were mixed at weight ratio of 50:50 in the glass frit obtained during the process. The mixture was pulverized by a ball mill for 5 hours to 7 hours and was then dried.

The glass frit subjecting the process passes through a mesh sieve (ASTM C285-88) and thus, a grain size thereof is controlled to 45 μm or less.

TABLE 3

| Composition (A) | |
| --- | --- |
| Component | wt % |
| $P_2O_5$ | 26.7 |
| $SiO_2$ | 18.5 |
| $Al_2O_3$ | 14.8 |
| $ZrO_2$ | 7.6 |
| $Na_2O$ | 13.2 |
| $K_2O$ | 13.1 |
| $Li_2O$ | 0.5 |
| $B_2O_3$ | 1.8 |
| $V_2O_5$ | 1.4 |
| SnO | 1.2 |
| ZnO | 1.2 |

Preparation of Enamel

The prepared glass frit for enamel was sprayed on a low carbon steel sheet having 200×200 (mm) and a thickness of 1 mm by a general corona discharge gun. The voltage of the discharge gun was controlled to 40 kV to 100 Kv. The amount of the glass frit sprayed on the low carbon steel sheet is 370 g/m². The low carbon steel on which the above described glass frit for enamel was sprayed was fired for 150 seconds to 350 seconds under a temperature condition of 820° C. to 850° C.

Evaluation of Characteristics

In order to measure the thermal expansion coefficients and the heat resistant characteristics of glass, a pellet type sample was fired under the same condition as the firing condition of enamel and both surfaces of the sample were ground in parallel. Then, the transition temperature, softening point, and thermal expansion coefficient of the sample were measured immediately after Ts (softening point) at a temperature raising rate of 10° C./min by a thermo mechanical analyzer (TMA). As the measuring result, Tg (transition temperature) was 478° C., Ts (softening point) was 563° C., and CTE (thermal expansion coefficient) was 145×10-7/° C.

The cleaning performance of the composition (A) for enamel was measured. A method for measuring the cleaning performance evenly applies grease or food debris of about 1 g as pollutant on the surface of the tested body (sample of 200×200 (mm) on which enamel is coated), puts the tested body, on which the pollutant is applied, in a pyrostat, and adheres the pollutant under a temperature of 240° C. and for 1 hour. After the tested body is adhered, the tested body was naturally cooled and the curing degree thereof was then confirmed. Thereafter, the tested body was dipped in a water tank including water for 10 minutes. Then, cured grease was wiped with a force of 2.5 kgf by wet cloths. Portions wiped on the polluted surface of enamel were equalized by a flat-bottomed rod having a diameter of 5 cm. At this time, the reciprocal frequency of wiping was measured, which is defined by the frequency of cleaning. The evaluation index is as follows. The cleaning performance of enamel made of the composition (A), which is measured by the above-mentioned method, was 5. The following Table 4 represents the cleaning performance.

Further, the acid-resistant and alkali-resistant performances of the enamel made of the composition (A) were measured. The acid resistance was measured by dropping a few drops of 10% of citric acid solution on the fired enamel sample, clearly wiping the solution after 15 minutes, and observing the surface change thereof. The alkali-resistant evaluation was measured by the same method as the acid-resistant evaluation, but used 10% of anhydrous sodium carbonate as a reagent.

The results are that the acid-resistant performance of the enamel made of the composition (A) was A and the alkali-resistant performance was AA. Herein, the degree representing the acid-resistant performance and the alkali-resistant performance were evaluated by ASTM and ISO 2722 method. AA is very excellent, A is excellent, B is good, C is poor, and D is very poor.

TABLE 4

| Cleaning Frequency (Frequency) | Level |
| --- | --- |
| 1~5 | 5 |
| 6~15 | 4 |
| 16~25 | 3 |
| 26~50 | 2 |
| 51~ | 1 |

Experimental Example 2

Preparation of Glass

The glass frit was prepared by the same method as Experimental Example 1 under components and wt % of the components that are represented in Table 5. Comparing with Experimental Example 1, BaO, $TiO_2$, and $CoO+Fe_2O_3$ were added and wt % of each component was changed.

TABLE 5

| Composition(B) | |
| --- | --- |
| Component | wt % |
| $P_2O_5$ | 26.35 |
| $SiO_2$ | 18 |
| $Al_2O_3$ | 15 |
| $ZrO_2$ | 8 |
| $Na_2O$ | 13 |
| $K_2O$ | 12 |
| $Li_2O$ | 0.5 |
| $B_2O_3$ | 1.9 |
| $V_2O_5$ | 1.5 |

TABLE 5-continued

| Composition(B) | |
| --- | --- |
| Component | wt % |
| SnO | 1.2 |
| BaO | 0.8 |
| ZnO | 1 |
| $TiO_2$ | 0.25 |
| $CoO + Fe_2O_3$ | 0.5 |

Preparation of Enamel

Enamel was prepared by the same method as Experimental Example 1.

Evaluation of Characteristics

The characteristics were evaluated by the same method as Experimental Example 1 and in thermal characteristic of glass made of composition (B), the transition temperature was 475° C., the softening point was 567° C., and the thermal expansion coefficient was 150×10-7/° C. The cleaning performance of the enamel made of the composition (B) was 5, the acid-resistant performance was A, and the alkali-resistance was AA. In other words, the transition temperature, softening point, thermal expansion coefficient of glass differ from Experimental Example 1 and the cleaning performance, acid-resistant performance, and alkali-resistance performance thereof were the same as Experimental Example 1.

Experimental Example 3

Preparation of Glass

The glass frit was prepared by the same method as Experimental Example 1 under components and wt % of the components that are represented in Table 5. The glass frit obtained by the process was combined as represented in Table 6 and was mixed for 10 hours to 20 hours by a wet mill or a mixer having a similar function, thereby preparing a slip. The grain size of the prepared slip was controlled to a degree that the frit, which does not pass through a sieve, remains 1 g to 3 g after the slip of 55 cc passes through 400 mesh.

TABLE 6

| Component | Combination ratio(wt %) |
| --- | --- |
| Composition B | 50 |
| Water | 50 |

TABLE 6-continued

| Component | Combination ratio(wt %) |
| --- | --- |
| Ball Clay | 10 |
| Nitrite | 0.25 |
| Borax | 0.1 |
| Aluminum Oxide | 2 |
| H500 | 1.5 |
| H575 | 1.5 |
| Sodium Nitrate | 0.3 |

Preparation of Enamel

The slip for the prepared wet enamel was sprayed on the low carbon steel sheet having 200×200 (mm) and a thickness of 1 mm by an air spray gun. The sample can be prepared by a dipping method not the spray method. The amount of glass sprayed on the low carbon steel was 370 g/m². The slip was coated on the low carbon steel and was subjected to a separate dry process (200° C. to 250° C., 5 minutes to 10 minutes). The glass frit for enamel as described above was sprayed and the low carbon sheet, which is subjected to the dry process, was fired for 150 seconds to 350 seconds under the temperature condition of 820° C. to 850° C.

Evaluation of Characteristics

The characteristics were evaluated by the same method as Experimental Example 1 and in the thermal characteristic of glass made of the composition (B), the transition temperature was 476° C., the softening point was 567° C., and the thermal expansion coefficient was 150×10-7/° C. The cleaning performance of the enamel made of the composition (B) was 5, the acid-resistant performance was A, and the alkali-resistant performance was AA. In other words, the transition temperature, softening point, thermal expansion coefficient of glass were different from Experimental Example 1, but the cleaning performance, the acid-resistant performance, and alkali-resistant performance were the same as Experimental Example 1.

Experimental Example 4

Preparation of Glass

The glass frit was prepared by the same method as Experimental Example 1 using the components and wt % that are represented in Table 7. Comparing Experimental Example 1, BaO and $TiO_2$ was added and wt % of each component was changed.

TABLE 7

| Component | Composition (C) wt % | Composition (D) wt % | Composition (E) wt % | Composition (F) wt % | Composition (G) wt % |
| --- | --- | --- | --- | --- | --- |
| $P_2O_5$ | 29.3 | 25 | 24.4 | 24.5 | 28.22 |
| $SiO_2$ | 18.4 | 17.4 | 17.24 | 17 | 20.19 |
| $Al_2O_3$ | 14.8 | 13.7 | 15.6 | 13.5 | 15.68 |
| $ZrO_2$ | 7.9 | 7.4 | 7.3 | 9.2 | 9.80 |
| $Na_2O$ | 11.3 | 12.7 | 12.2 | 12.3 | 9.80 |
| $K_2O$ | 12.1 | 12.5 | 12.1 | 12.2 | 9.70 |
| $Li_2O$ | 0.5 | 0.48 | 0.48 | 0.48 | 0.49 |
| $B_2O_3$ | 1.8 | 6.4 | 6.3 | 6.41 | 1.76 |
| $V_2O_5$ | 0.49 | 0.99 | 0.97 | 0.98 | 0.98 |
| SnO | 1.2 | 1.18 | 1.17 | 1.18 | 1.18 |
| BaO | 0.78 | 0.8 | 0.8 | 0.8 | 0.78 |
| ZnO | 1.18 | 1.2 | 1.2 | 1.2 | 1.18 |
| $TiO_2$ | 0.25 | 0.25 | 0.24 | 0.25 | 0.24 |

Preparation of Enamel

Enamel was prepared by the same method as Experimental Example 1 or Experimental Example 3.

Evaluation of Characteristics

The characteristics were evaluated by the same method as Experimental Example 1 and in the thermal characteristic of glass made of the composition (C), the transition temperature was 477° C., the softening point was 557° C., and the thermal expansion coefficient was 110×10-7/° C. The cleaning performance of the enamel made of the composition (C) was 5, the acid-resistant performance was AA, and the alkali-resistant performance was AA. In other words, the transition temperature, softening point, thermal expansion coefficient of glass were different from Experimental Example 1, but the cleaning performance and the alkali-acid performance were the same as Experimental Example 1 but the acid-resistant performance was improved to AA.

In the thermal characteristic of glass made of the composition (D), the transition temperature was 463° C., the softening point was 551° C., and the thermal expansion coefficient was 145×10-7/° C. The cleaning performance of the enamel made of the composition (D) was 5, the acid-resistant performance was A, and the alkali-resistant performance was AA. In other words, the transition temperature, softening point, thermal expansion coefficient of glass have a difference with Experimental Example 1, but the cleaning performance, the acid-resistant performance, and the alkali-resistant performance were the same as Experimental Example 1.

In the thermal characteristic of glass made of the composition (E), the transition temperature was 460° C., the softening point was 552° C., and the thermal expansion coefficient was 133×10-7/° C. The cleaning performance of the enamel made of the composition (E) was 5, the acid-resistant performance was A, and the alkali-resistant performance was AA. In other words, the transition temperature, softening point, thermal expansion coefficient of glass were different from Experimental Example 1, but the cleaning performance, the acid-resistant performance, and the alkali-resistant performance were the same as Experimental Example 1.

In the thermal characteristic of glass made of the composition (F), the transition temperature was 454° C., the softening point was 542° C., and the thermal expansion coefficient was 140×10-7/° C. The cleaning performance of the enamel made of the composition (F) was 5, the acid-resistant performance was A, and the alkali-resistant performance was AA. In other words, the transition temperature, softening point, thermal expansion coefficient of glass were different from Experimental Example 1, but the cleaning performance, the acid-resistant performance, and the alkali-resistant performance are the same as Experimental Example 1.

In the thermal characteristic of glass made of the composition (G), the transition temperature was 488° C., the softening point was 598° C., and the thermal expansion coefficient was 110×10-7/° C. The cleaning performance of the enamel made of the composition (G) was 5, the acid-resistant performance was AA, and the alkali-resistant performance was AA. In other words, the transition temperature, softening point, thermal expansion coefficient of glass were different from Experimental Example 1, but the cleaning performance and the alkali-acid performance are the same as Experimental Example 1 but the acid-resistant performance was improved to AA.

Experimental Example 5

The experiment was performed while the content of SnO is changed from 0.5 wt % to 4 wt % as represented in Table 8.

TABLE 8

| Composition | H-1 | H-2 | H-3 | H-4 | H-5 |
|---|---|---|---|---|---|
| $P_2O_5$ | 26.3 | 26.2 | 25.9 | 25.7 | 25.4 |
| $SiO_2$ | 18.3 | 18.2 | 18.0 | 17.8 | 17.7 |
| $Al_2O_3$ | 14.7 | 14.6 | 14.5 | 14.3 | 14.2 |
| $ZrO_2$ | 7.8 | 7.8 | 7.7 | 7.6 | 7.6 |
| $Na_2O$ | 13.2 | 13.1 | 13.0 | 12.9 | 12.7 |
| $K_2O$ | 13.1 | 13.1 | 12.9 | 12.8 | 12.7 |
| $Li_2O$ | 0.5 | 0.5 | 0.5 | 0.5 | 0.5 |
| $B_2O_3$ | 1.9 | 1.9 | 1.8 | 1.8 | 1.8 |
| $V_2O_5$ | 1.5 | 1.5 | 1.4 | 1.4 | 1.4 |
| SnO | 0.5 | 1.0 | 2.0 | 3.0 | 4.0 |
| BaO | 0.8 | 0.8 | 0.8 | 0.8 | 0.8 |
| ZnO | 1.2 | 1.2 | 1.2 | 1.1 | 1.1 |
| $TiO_2$ | 0.2 | 0.2 | 0.2 | 0.2 | 0.2 |

The glass frit was prepared by the same method as Experimental Example 1 to prepare the pellet sample at a size of 5×5×15 mm and the firing condition was 850° C. and 5 minutes.

Figure 4:
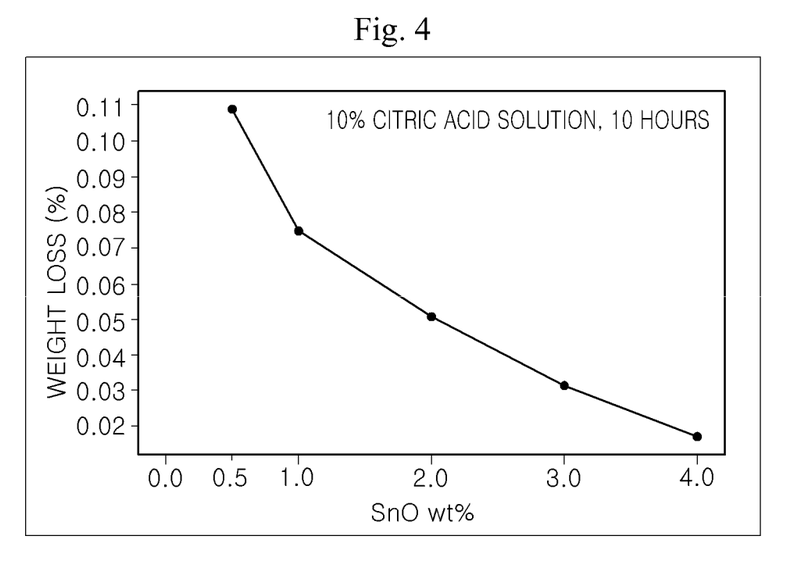
FIG. 4 is a graph showing an increase in acid resistance according to an increase in SnO addition of the enamel composition of the present invention.

FIG. 4 shows the results of measuring weight loss % after the samples (H-1 to H-5) prepared by the above method are maintained in 10 mL of solution including 10% of citric acid for 10 hours.

It can be appreciated from the result of FIG. 4 that the acid resistance of the enamel composition is increased as the SnO addition is increased up to 4 wt %.

Comparative Example

A comparison experiment for the cleaning performance of a general enamel having the component composition as represented in Table 9 and the cleaning performance of the enamel composition of the present invention was performed.

TABLE 9

| Composition of general enamel | |
|---|---|
| Component | Wt % |
| $SiO_2$ | 60 |
| $B_2O_3$ | 14 |
| $Na_2O$ | 13 |
| CaO | 1.5 |
| CuO | 1.5 |
| $Li_2O$ | 1 |
| $TiO_2$ | 2 |
| $ZrO_2$ | 2 |
| $Al_2O_3$ | 1 |
| MgO | 1 |
| ZnO | 1 |
| MO | 1.2 |
| $Co_2O_3$ | 0.8 |

When the cleaning performance was evaluated by preparing the glass using the same method as Experimental Example 1 and preparing the enamel, the general enamel exhibits that the cleaning frequency is 51 times or more and a level 1 and the composition of the present invention exhibits that the cleaning frequency is a level 5.

Through the comparison experimental result, the cleaning performance of the enamel composition of the present invention is excellent as compared to the composition of boron silicate enamel used in a cooking appliance and an oven range. Thus, the cleaning of the cooking appliance and the oven range can be easily performed.

As described above, as the results of the implementation of Experimental Example 1 demonstrate, the enamel composition according to the present invention cleaning performance, heat resistance, and chemical resistance. In addition, as the results of the implementation of Experimental Example 1 demonstrate, the frit preparing process is reduced by two times, which saves energy of several tens of kWh to several hundreds of kWh.

In addition, the heat resistance and the chemical resistance are excellent as compared to the enamel having the cleaning functionality of the related art according to the results that the enamel composition is applied to an electric oven and a gas oven. Therefore, the high heat-resistant characteristics increases the easiness of the design of the oven and the application of the various heaters as compared to the related art, thereby making it possible to improve the cooking performance and the thermal efficiency that are the inherent function of the oven. In addition, the high chemical resistance and the wear resistance improves the durability of the oven as compared to the related art.

The technology of preparing enamel using a plurality of frits is complicated, but the enamel composition of the present invention prepares the single glass frit without mixing the frits, thereby making it possible to save energy costs in the preparation and simplify the process. In addition, when a plurality of frits are used, uneven mixing between the frits can occur, but when one frit is used according to the present invention, an even mixing occurs.

In the enamel composition according to the present invention, the average thermal expansion coefficient is $110 \times 10^{-7}/°$ C. to $155 \times 10^{-7}/°$ C. within 50° C. to 300° C. after it is subjected to the dry coating and firing. Therefore, damage of the adhesive surface can be prevented by compressing the deformation that is applied to the adhesive surface after performing the adhesion by the enamel forming material.

In addition, the enamel composition according to the present invention has an improved heat resistance, etc. In addition, the firing temperature is 820° C. to 850° C. and the enamel composition is mounted on the hard frit and is suitable for the process of preparing enamel that is heat-treated after secondary dry coating that exhibits the cleaning function. Therefore, the enamel composition can be prepared as substitute goods that can sufficiently satisfy the characteristics and the firing temperature condition having the enamel composition that is applied to the wet enamel product in the related art.

Although the present invention mainly describes embodiments that are described by way of example, the present invention is not limited thereto. Those skilled in the art to which the present invention belongs can make several modifications and applications without departing from the substantial characteristics of the embodiments. For example, each component showing the embodiment in detail can be modified and performed. The differences related to the modifications and applications can be construed to be included in the scope of the present invention that is described in the appended claims.

The present invention provides the enamel composition with improved heat resistance, chemical resistance, wear resistance, and pollution resistance and implements various pollutants essentially generated on the internal surface of a cavity such as a household oven after the oven product is used, thereby providing the cooking appliance that can be easily cleaned at a room temperature or between usages.

What is claimed is:

1. A cooking appliance, comprising:
   a cavity forming a cooking chamber;
   a door that selectively opens and closes the cooking chamber;
   at least one heating source that provides heat to heat food in the cooking chamber; and
   a coating layer coating an inner surface of the cavity, wherein the coating layer is formed by an enamel composition produced by one frit including $P_2O_5$, $B_2O_3$, and SnO, and
   wherein
   $P_2O_5$ is 24.8 wt % to 34.3 wt %;
   $B_2O_3$ is 1.0 wt % to 10.0 wt %; and
   SnO is 0.5 wt % to 5.0 wt %.

2. The cooking appliance according to claim 1, wherein further comprises a space formed by the door and the cooking chamber where food is cooked, wherein the door is shielded, wherein the coating layer is also coating an inner surface of the space.

3. The cooking appliance according to claim 1, wherein the enamel composition further includes $SiO_2$, $Al_2O_3$, $ZrO_2$, and $R_2O$, wherein R is at least one of Li, Na and K.

4. The cooking appliance according to claim 3, wherein the enamel composition further includes at least one of BaO and $TiO_2$.

5. The cooking appliance according to claim 3, wherein the enamel composition further includes a mixture including at least one of CoO and $Fe_2O_3$.

6. The cooking appliance according to claim 4, wherein the enamel composition further includes a mixture including at least one of CoO and $Fe_2O_3$.

7. The cooking appliance according to claim 1, wherein the enamel composition has an average thermal expansion coefficient of $110 \times 10^{-7}/°$ C. to $155 \times 10^{-7}/°$ C. in the range of 50° C. to 300° C.

8. The cooking appliance according to claim 1, wherein the coating layer is formed in one layer.

9. The cooking appliance according to claim 1, wherein the coating layer is formed by coating the enamel composition with a dry method.

10. The cooking appliance comprising the enamel composition, wherein the enamel composition includes $P_2O_5$, $SiO_2$, $Al_2O_3$, $ZrO_2$, $V_2O_5$, $B_2O_3$, SnO, and $R_2O$, wherein R is at least one of Li, Na, and K, and
    wherein
    $P_2O_5$ is 24.8 wt % to 34.3 wt %;
    $SiO_2$ is 10.8 wt % to 22.2 wt %;
    $Al_2O_3$ is 10.2 wt % to 28.4 wt %;
    $ZrO_2$ is 5.0 wt % to 17.9 wt %;
    $V_2O_5$ is 0.9 wt % to 10.0 wt %,
    $B_2O_3$ is 1.0 wt % to 10.0 wt %;
    $R_2O$ is 0.4 wt % to 20.8 wt %; and
    SnO is 0.5 wt % to 5.0 wt %.

11. The cooking appliance according to claim 10, wherein the enamel composition further includes ZnO.

12. The cooking appliance according to claim 10, wherein the enamel composition further includes at least one of BaO and $TiO_2$.

13. The cooking appliance according to claim 11, wherein the enamel composition further includes at least one of BaO and $TiO_2$.

14. The cooking appliance according to claim 10, wherein the enamel composition further includes a mixture including at least one of CoO and $Fe_2O_3$.

15. The cooking appliance according to claim 11, wherein the enamel composition further includes a mixture including at least one of CoO and $Fe_2O_3$.

16. The cooking appliance according to claim 10, wherein the enamel composition has an average thermal expansion coefficient of $110 \times 10^{-7}/°$ C. to $155 \times 10^{-7}/°$ C. in the range of 50° C. to 300° C.

17. The cooking appliance according to claim 11, wherein ZnO is 0.3 wt % to 10.0 wt %.

* * * * *